(12) United States Patent
Banerjee et al.

(10) Patent No.: US 7,236,476 B2
(45) Date of Patent: Jun. 26, 2007

(54) MSCTP BASED HANDOVER OF A MOBILE DEVICE BETWEEN NON-INTERSECTING NETWORKS

(75) Inventors: Dwip N. Banerjee, Austin, TX (US); Kavitha Vittal Murthy Baratakke, Austin, TX (US); Vasu Vallabhaneni, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 10/677,656

(22) Filed: Oct. 2, 2003

(65) Prior Publication Data

US 2005/0073981 A1   Apr. 7, 2005

(51) Int. Cl.
*H04Q 7/00*   (2006.01)
*H04L 12/56*   (2006.01)

(52) U.S. Cl. .................... 370/331; 370/395.52
(58) Field of Classification Search ................ 370/328, 370/331, 332, 395.52; 455/436, 437, 440
See application file for complete search history.

(56) References Cited

U.S. PATENT DOCUMENTS

| | | | |
|---|---|---|---|
| 5,903,851 A | 5/1999 | Backstrom et al. | 455/557 |
| 6,456,594 B1 | 9/2002 | Kaplan et al. | 370/238 |
| 6,850,503 B2* | 2/2005 | Dorenbosch et al. | 370/331 |
| 2001/0053145 A1 | 12/2001 | Willars et al. | 370/352 |
| 2002/0093981 A1 | 7/2002 | Turina et al. | 370/467 |
| 2002/0114272 A1 | 8/2002 | Stewart | 370/218 |
| 2002/0136226 A1* | 9/2002 | Christoffel et al. | 370/401 |
| 2003/0013489 A1 | 1/2003 | Mar et al. | 455/560 |
| 2003/0016684 A1 | 1/2003 | Prasad et al. | 370/410 |
| 2003/0027567 A1 | 2/2003 | Rest et al. | 455/427 |
| 2003/0191768 A1 | 10/2003 | Choy et al. | 379/219 |
| 2004/0028009 A1* | 2/2004 | Dorenbosch et al. | 370/329 |

OTHER PUBLICATIONS

IBM Technical Disclosure Bulletin, vol. 36 No. 02 Feb. 1993 *Robust Automatic Flow Control for High-Speed Data Transmission*.
Internet Draft, http://www.ietf.org/internet-drafts/draft-sjkoh-sctp-mobility-02.http; Architecture of Mobile SCTP for IP Mobility Support.
Internet Draft, http://www.ietf.org/internet-drafts/draft-riegel-tuexen-mobile-sctp-03.http; Mobile SCTP.

* cited by examiner

*Primary Examiner*—Nguyen T. Vo
(74) *Attorney, Agent, or Firm*—Marilyn S. Dawkins; Amy J. Pattillo

(57) ABSTRACT

Responsive to detecting a need for a mobile device to transfer out of a first network, requests are sent from the mobile device to a communication endpoint in mSCTP. The first request is to stop transmissions to a first address of said mobile device. The second request is to add an intermediary address of a mobility support service designated for receiving any communications already in transmission when the first request is sent. The communication link for the mobile device is then transitioned from the current address at the first network to a second address at a second network. The first network and the second network are non-intersecting networks. The mobile device then indicates to the mobility support service that the handover from the first network to the second network is complete. The mobility support service responds to the completion by sending a third request in mSCTP to the communication endpoint to continue communication with the mobile client at the second address.

27 Claims, 5 Drawing Sheets

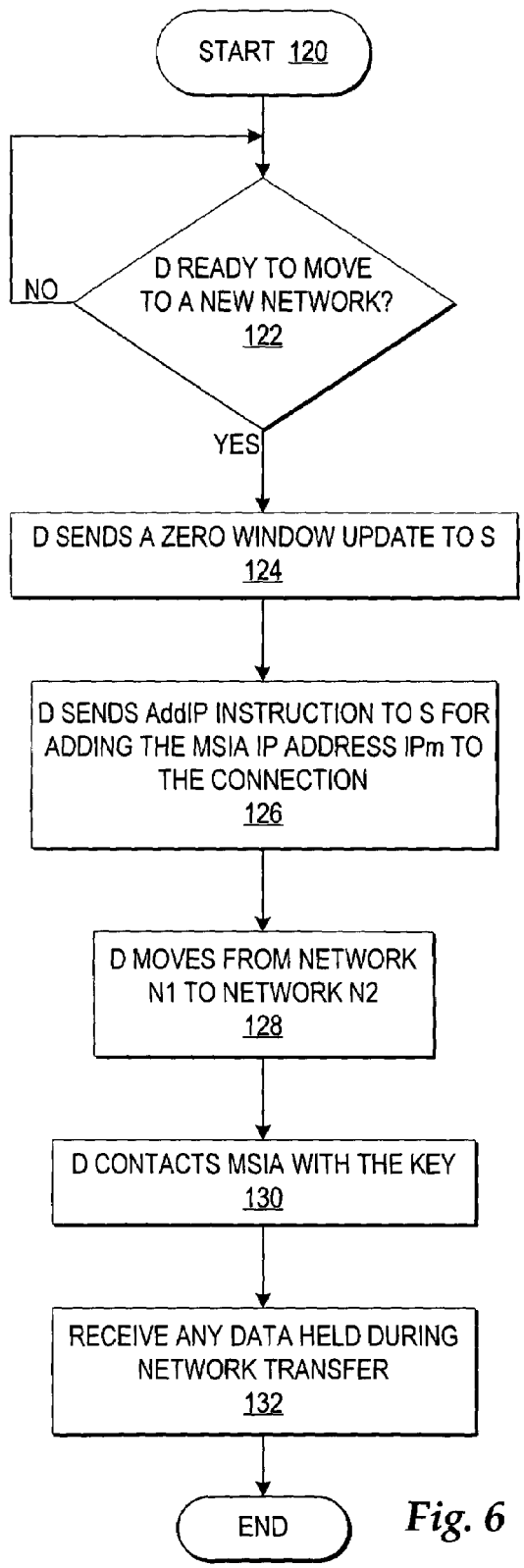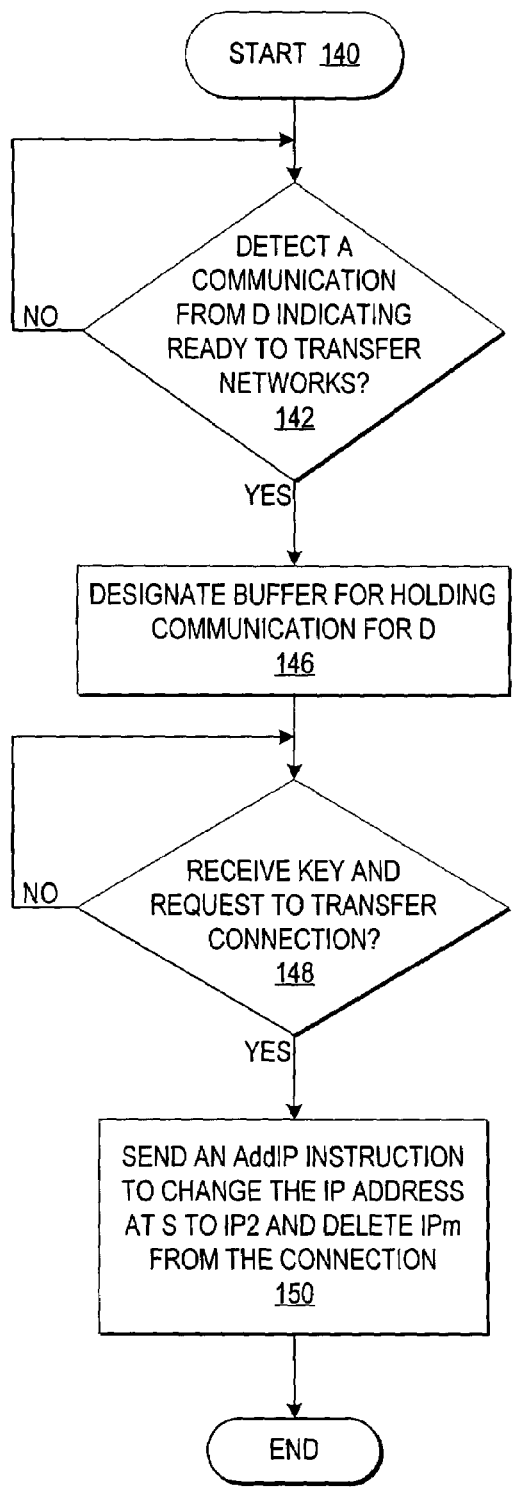
Fig. 6
Fig. 7

MSCTP BASED HANDOVER OF A MOBILE DEVICE BETWEEN NON-INTERSECTING NETWORKS

BACKGROUND OF THE INVENTION

1. Technical Field

The present invention relates in general to telecommunications and in particular to a method for handing over a mobile telephony device. Still more particularly, the present invention relates to mSCTP based handover of a mobile device between non-intersecting networks.

2. Description of the Related Art

The development of computerized information resources, such as interconnection of computer networks, allows users of data processing systems to link with servers within a network to access vast amounts of electronic information. Multiple types of computer networks have been developed that provide different types of security and access and operate at different speeds. For example, the internet, also referred to as an "internetwork", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the Transmission Control Protocol (TCP)/Internet Protocol (IP) suite of protocols.

One of the growing uses of the Internet is for communications. As the Internet and the Public Switching Telephone Network (PSTN) intertwine for supporting voice transmission, the Stream Control Transmission Protocol (SCTP) has been defined as an alternative to TCP to better support this type of communication. Specifically, SCTP supports transmission of PSTN signaling messages over IP networks.

As mobile communications become the norm, there is a push to integrate mobile communications with the Internet. Thus, a version of SCTP is being defined that includes a multihoming feature for supporting IP mobility. The mobile SCTP (mSCTP), defined by the Internet Engineering Task Force (IETF), would purport to support the handover of mobile devices moving from one location to another. A limitation of the mSCTP specification is that it assumes the mobile devices will handover between two intersecting networks. In fact, it is often the case that a mobile device is handed over between two non-intersecting networks. Therefore, it would be advantageous to provide a method, system, and program for SCTP based handovers of mobile devices between two non-intersecting networks.

SUMMARY OF THE INVENTION

In view of the foregoing, it is therefore an object of the present invention to provide improved telecommunication systems.

It is another object of the present invention to provide a method, system and program for handing over a mobile telephony device.

It is yet another object of the present invention to provide a method, system and program for mSCTP based handover of a mobile device between non-intersecting networks.

According to one aspect of the present invention, responsive to detecting a need for a mobile device to transfer out of a first network, requests are sent from the mobile device to a communication endpoint in a mobile transmission protocol. The first request is to stop transmissions to a first address of said mobile device. The second request is to add an intermediary address of a mobility support service designated for receiving any communications already in transmission when the first request is sent. The communication link for the mobile device is then transitioned from the current address at the first network to a second address at a second network. The first network and the second network are non-intersecting networks. The mobile device then indicates to the mobility support service that the handover from the first network to the second network is complete. The mobility support service responds to the completion by sending a third request in the mobile transmission protocol to the communication endpoint to continue communication with the mobile client at the second address.

According to another aspect of the present invention, the mobility support service responds to the handover completion by sending any buffered communications already in transmission when the first request is sent.

According to yet another aspect of the present invention, the mobile device indicates to the mobility support service that the handover is complete by sending a key from the second address. The mobile device receives the key by registering the first address with the support service and receiving an encrypted key for use in future communications with the mobility support service from the second address.

According to another aspect of the present invention, the mobile transmission protocol is the mobile Stream Control Transmission Protocol (mSCTP). The first request sent in mSCTP is a zero window update. The second and third requests sent in mSCTP are AddIP requests.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 is a high level logic flowchart depicting a process and program for a mobile device initiated transfer from one network to another non-intersecting network; and FIG. 7 is a high level logic flowchart depicting a process and program for facilitating a handover of a mobile device through an MSIA.

DETAILED DESCRIPTION OF THE PREFERRED EMBODIMENT

In the present invention, a mobile device is handed off from one network to another non-intersecting network. The mobile device is preferably a computer system, such as the computer system described in FIG. 1, operating as a mobile telephony device. The mobile device may be integrated into multiple types of computer systems including, but not limited to, personal digital assistants, wireless telephones, and other portable computing systems focused on speech and text communications. The mobile device is communicating with another device, which may be mobile or stationary, and which is preferably a computer system, such as the computer system described in FIG. 1, enabled for telephony. During handoff from one network to another non-intersecting network, a Mobility Support Infrastructure Application (MSIA) supports the handoff. The MSIA is preferably implemented in a computer system, such as the computer system described in FIG. 1, with network accessibility and large storage capacity.

Figure 1:
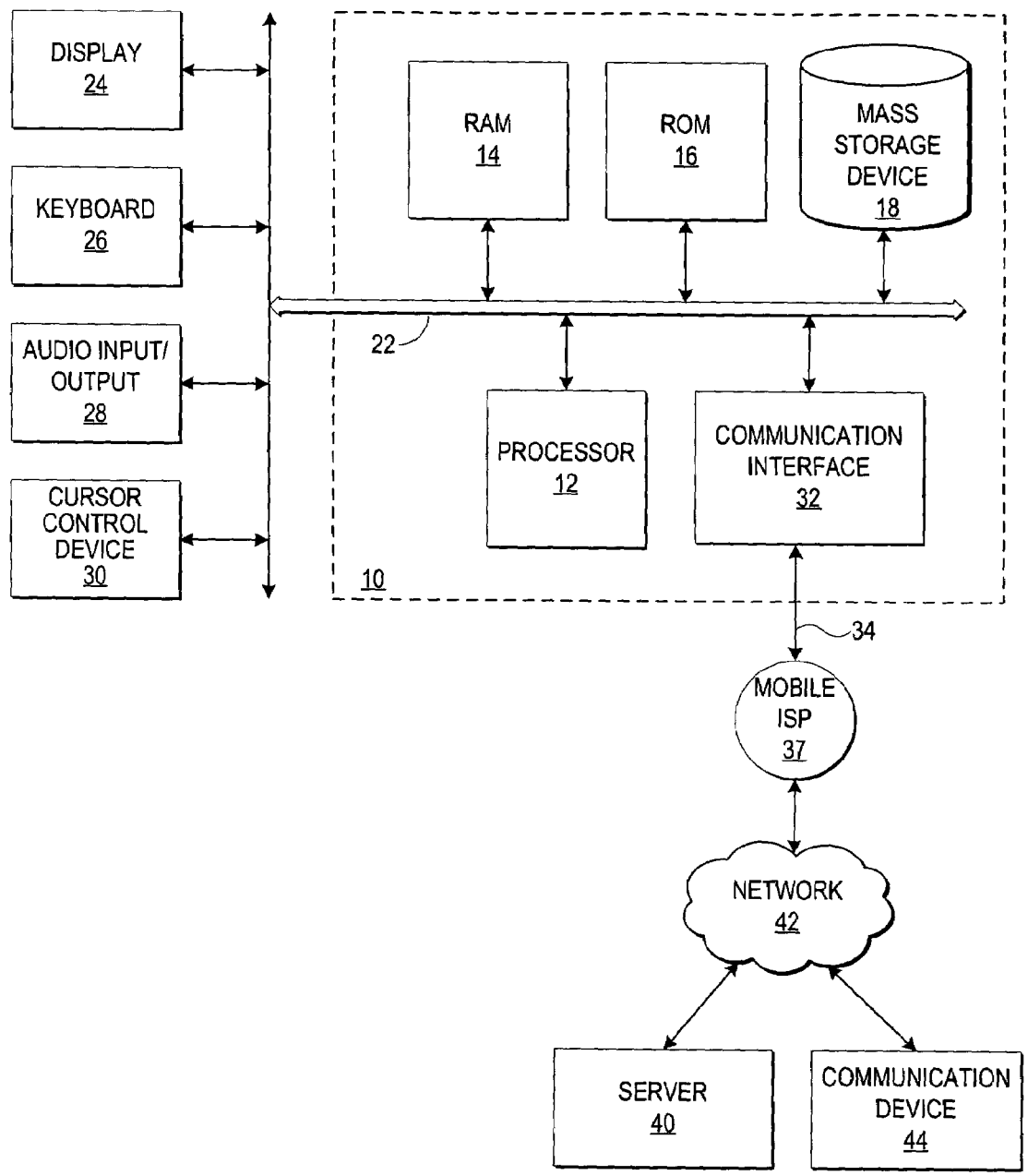
FIG. 1 is a block diagram depicting a computer system in which the present method, system, and program may be implemented.

Referring now to the drawings and in particular to FIG. 1, there is depicted one embodiment of a computer system in which the present method, system, and program may be implemented. The present invention may be executed in a variety of systems, including a variety of computing systems and electronic devices under a number of different operating systems. In general, the present invention is executed in a computer system that performs computing tasks such as manipulating data in storage that is accessible to the computer system. In addition, the computer system includes at least one output device and at least one input device.

Computer system 10 includes a bus 22 or other communication device for communicating information within computer system 10, and at least one processing device such as processor 12, coupled to bus 22 for processing information. Bus 22 preferably includes low-latency and higher latency paths that are connected by bridges and adapters and controlled within computer system 10 by multiple bus controllers. When implemented as a server system, computer system 10 typically includes multiple processors designed to improve network servicing power.

Processor 12 may be a general-purpose processor such as IBM's PowerPC™ processor that, during normal operation, processes data under the control of operating system and application software accessible from a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 4, 5, 6, 7, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of a non-volatile medium is mass storage device 18 which as depicted is an internal component of computer system 10, but will be understood to also be provided by an external device. Volatile media include dynamic memory such as RAM 14. Transmission media include coaxial cables, copper wire or fiber optics, including the wires that comprise bus 22. Transmission media can also take the form of acoustic or light waves, such as those generated during radio frequency or infrared data communications.

Moreover, the present invention may be downloaded as a computer program product, wherein the program instructions may be transferred from a remote computer such as a server 40 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to multiple types of communication media including, but not limited to, a local area network (LAN), a wide area network (WAN), or as depicted herein, directly to a Mobile Internet Service Provider (ISP) 37. In particular, network link 34 may provide wired and/or wireless network communications to one or more networks.

Mobile ISP 37 in turn provides data communication services through network 42. Network 42 may refer to the worldwide collection of networks and gateways that use a particular protocol, such as Transmission Control Protocol (TCP) and Internet Protocol (IP), to communicate with one another. Mobile ISP 37 and network 42 both use signals including, but not limited to, electrical, electromagnetic, or optical signals that carry digital data streams. The signals through the various networks and the signals on network link 34 and through communication interface 32, which carry the digital data to and from computer system 10, are exemplary forms of carrier waves transporting the information.

In addition to receiving a computer program product via network 42, computer system 10 may also communicate with other communication devices, such as communication device 44, through network 42. Communication device 44 may include mobile and non-mobile devices enabled for telephony. Where computer system 10 and communication device 44 communicate, each may be assigned an IP address utilized by an SCTP layer to determine the source and destination nodes of communications. Furthermore, computer system 10 may be a mobile device enabled for telephony and able to move from one network to another.

When implemented as a server system, computer system 10 typically includes multiple communication interfaces accessible via multiple peripheral component interconnect (PCI) bus bridges connected to an input/output controller. In this manner, computer system 10 allows connections to multiple network computers.

Further, multiple peripheral components may be added to computer system 10, connected to multiple controllers, adapters, and expansion slots coupled to one of the multiple levels of bus 22. For example, an audio input/output 28 is connectively enabled on bus 22 for controlling audio input through a microphone or other sound or lip motion capturing device and for controlling audio output through a speaker or other audio projection device. A display 24 is also connectively enabled on bus 22 for providing visual, tactile or other graphical representation formats. A keyboard 26 and cursor control device 30, such as a mouse, trackball, or cursor direction keys, are connectively enabled on bus 22 as interfaces for user inputs to computer system 10. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
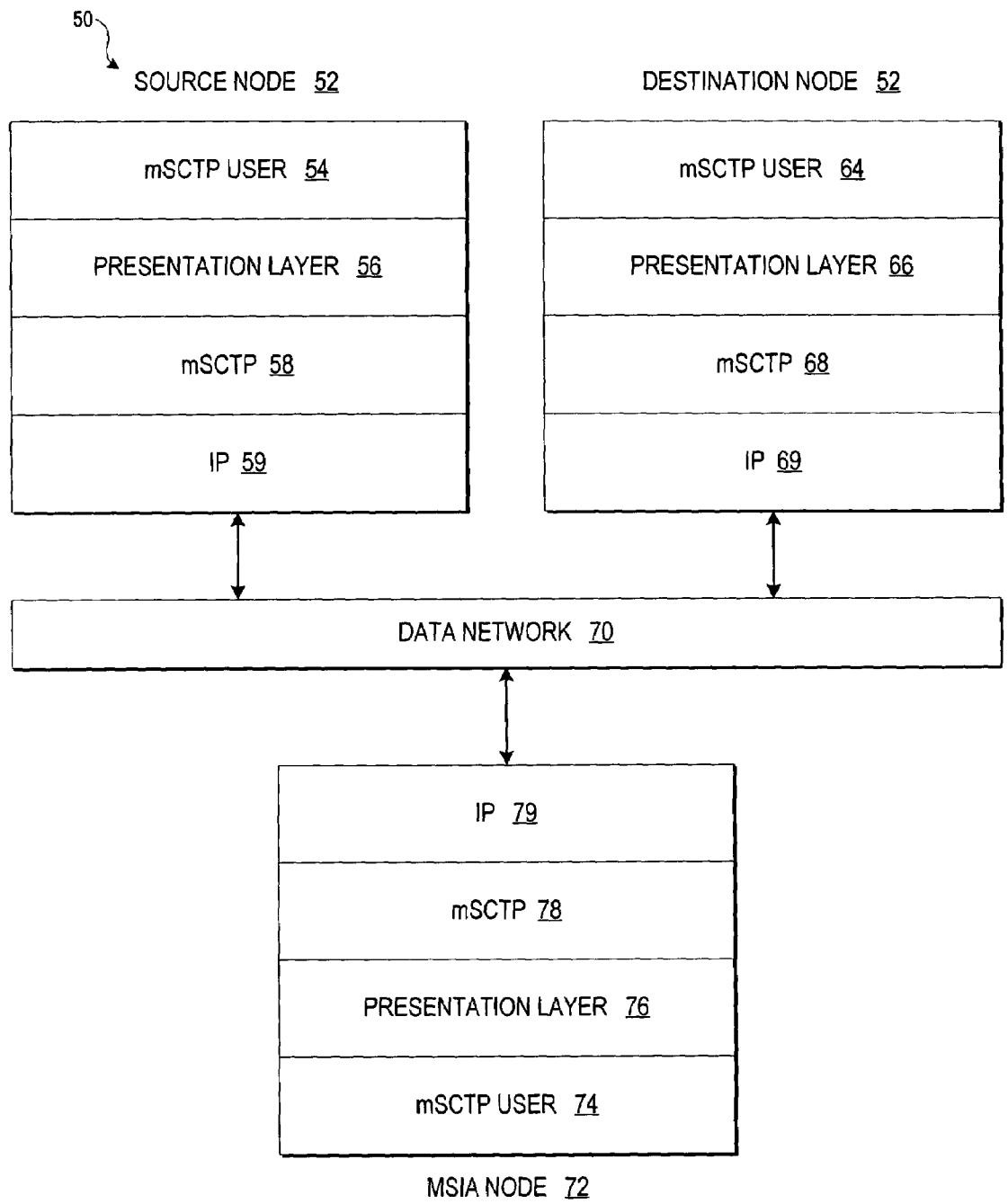
FIG. 2 is a block diagram depicting a transport protocol stack in accordance with the method, system, and program of the present invention.

With reference now to FIG. 2, a block diagram depicts a transport protocol stack in accordance with the method, system, and program of the present invention. As illustrated, a protocol stack 50 includes a source node stack 52 and a destination node stack 62 communicatively connected via a data network 70. As will be further described in FIG. 3, the source node is any communication endpoint in communication with the destination node, which is a mobile device.

On top of the Internet Protocol (IP) layers 59 and 69 run mobile Stream Control Transmission Protocol (mSCTP) layers 58 and 68. The mSCTP has been developed to improve the quality of mobile service capabilities. In particular, an AddIP extension is utilized by mSCTP to support handovers of mobile devices.

Each node stack is assigned at least one IP address. In general, the mSCTP layer tracks the source node and destination node IP addresses and hands data to be transmitted over to the IP layer that then forwards the data to the designated node addresses. The AddIP extension allows these IP addresses to be added and removed dynamically in mSCTP layers 58 and 68 during the life of a connection between the source node and the destination node.

On top of mSCTP layers 58 and 68 run presentation layers 56 and 66. Presentation layers 56 and 66 may include multiple types of protocol for enabling presentation and application. Examples of protocols that may be included in presentation layers 56 and 66 include, but are not limited to, Session Initiation Protocol (SIP), Reliable Server Pooling (RSP), hypertext transfer protocol (HTTP), file-transfer protocol (FTP), name-server protocol (DNS), and simple network-management protocol (SNMP). Further, mSCTP users 54 and 64 run atop presentation layers 56 and 66.

Returning to mSCTP layers 58 and 68, these layers support an mSCTP association between source node 52 and destination node 62. Each of the nodes has an IP address assigned thereto. An mSCTP association is initiated on request of one of the nodes and is maintained between the two nodes in the present invention, even as one of the mobile devices encompassing a node moves from one network, to another, non-intersecting network. In particular, a Mobility Support Infrastructure Application (MSIA) node 72 acts as a buffer for any communications received by a mobile device handed over from one network to another non-intersecting network. MSIA node 72 includes an IP layer 79, and mSCTP layer 78, a presentation layer 76, and an mSCTP user layer 74 for supporting communications with source node 52 when destination node 62 is handed over from data network 70 to a non-intersecting network.

Figure 3:
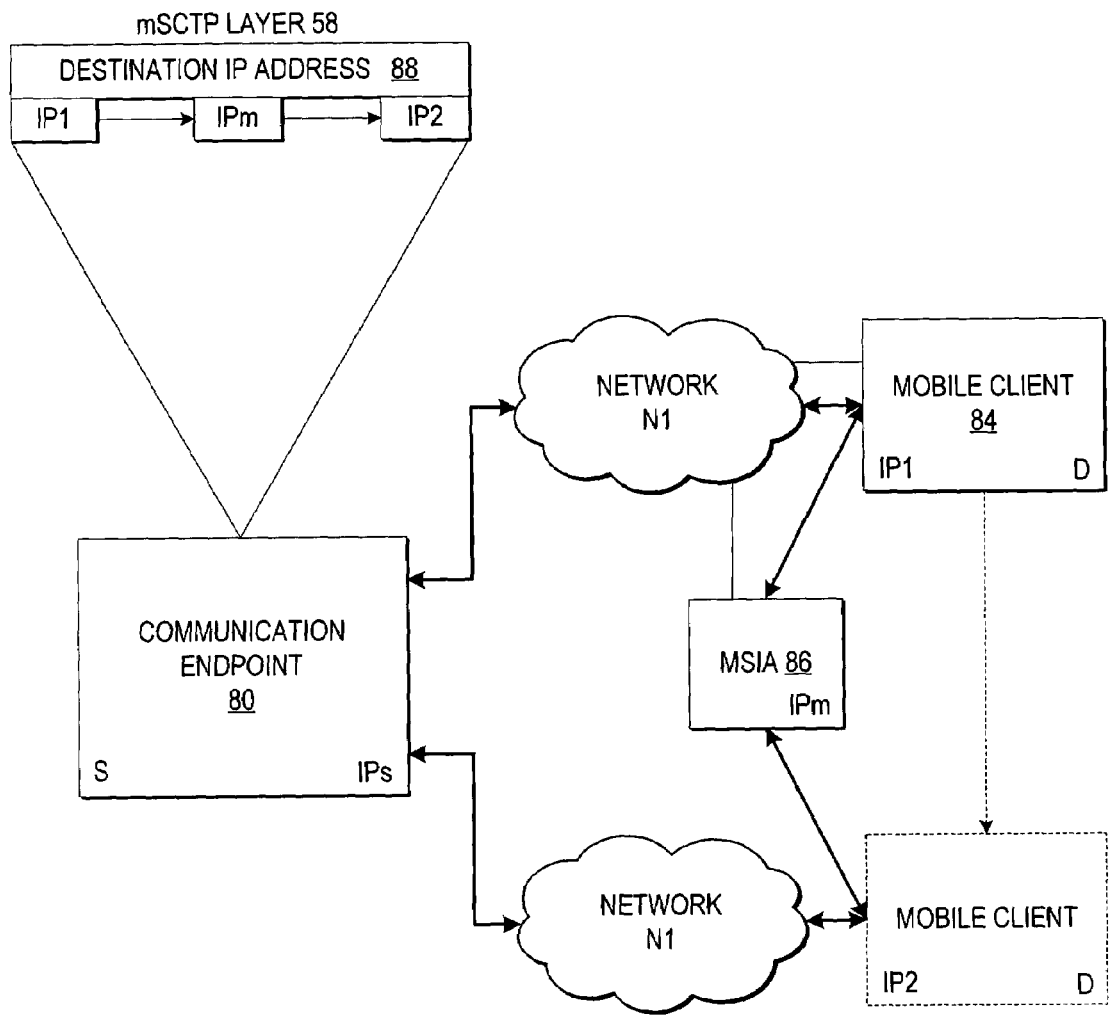
FIG. 3 is a block diagram depicting a distributed network system facilitating SCTP based handover of a mobile device between non-intersecting networks in accordance with the method, system, and program of the present invention.

With reference now to FIG. 3, a block diagram depicts a distributed network system facilitating SCTP based handover of a mobile device between non-intersecting networks in accordance with the method, system, and program of the present invention. For purposes of example, a communication endpoint 80 is designated as the source node (S) in communication with a mobile client 84 as the destination node (D). Communication endpoint 80 is encompassed in any computing device with an IP address. In the example, communication endpoint 80 is located at an IP address IPa. It will be understood that in alternate embodiments, communication endpoint 80 may be assigned multiple IP addresses, one of which is designated in the communication link with mobile client 84.

Initially, in the example, communication endpoint 80 and mobile client 84 communicate via network N1. Network N1 may include server systems and routers that enable voice and text messaging communications across the Internet. Networks N1 and N2 preferably enable access to cellular networks and the PSTN via the Internet. Networks N1 and N2 may encompass cellular base stations, mobile stations, and other mobile network structures that provide service to mobile devices, such as mobile device 84.

Networks N1 and N2 are non-intersecting, meaning that network N1 has a viable signal range that does not intersect with the viable signal range of network N2. For example, the viable signal range is the range in which mobile device 84 receives a sufficient signal to enable suitable quality of voice and text output. Mobile device 84 detects when it is moving to the edge of the viable signal range for network N1 and will need to be handed over to network N2, when within the viable signal range for network N2.

As described in FIG. 2, mobile client 84 handles a protocol stack that includes mSCTP layer 58. Initially, in the example, mobile client 84 is located at IP address IP1. Communication endpoint 80 sets the destination of all communications with mobile client 84 at IP address IP1, as illustrated by the destination address 88 of mSCTP layer 58. Mobile client 84 sends a request to MSIA 86 to register the current IP address IP1. MSIA 86 returns a key to mobile client 84 to use in future communications.

Later, when mobile client 84 detects that it is moving to a location outside the viable signal range of network N1, mobile client 84 sends a zero window update to communication endpoint 80 to stop sending any new data during the handover and sends an AddIP request to communication endpoint 80 to add IP address IPm for communications with mobile client 84. MSIA 86, assigned to IPm, sets aside a buffer to receive communications already on the network before the zero window update was received by communication endpoint 80. In particular, both addesses IP1 and IPm will be set as the destination address at communication endpoint 80. Communications already on the network before the zero window update will fail at attempts to reach IP address IP1 and thus mSCTP layer 58 will transmit an attempt to reach IP address IPm.

Next, through a Dynamic Host Configuration Protocol (DHCP) server or other address assignment service, IP address IP2 is designated for and assigned to mobile client 84 for service through network N2. Once mobile client 84 is handed over to network N2, mobile client 84 sends the key to MSIA 86 and requests that MSIA 86 transmit any buffered data to mobile client 84. Upon receiving the secure key, MSIA 86 sends an AddIP request to communication endpoint 80 to add IP address IP2 as the destination address for communications with mobile client 84 and delete IP address IPm. Additionally, MSIA 86 transfers any buffered communications to mobile client 84.

Figure 4:
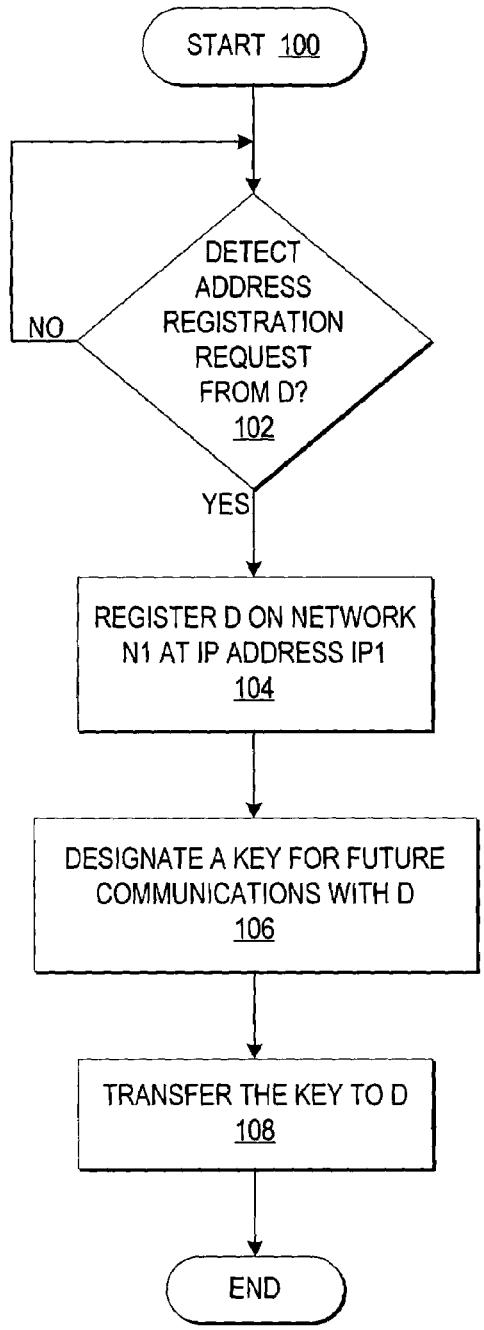
FIG. 4 is a high level logic flowchart depicting a process and program for creating a communication key at an MSIA.

With reference now to FIG. 4, there is depicted a high level logic flowchart of a process and program for creating a communication key at an MSIA. As illustrated, the process starts at block 100 and thereafter proceeds to block 102. Block 102 depicts a determination whether an address registration request is received from D. If an address registration request is not received, the process iterates at block 102. Once an address registration request is received, the process passes to block 104. Block 104 illustrates registering D as located on network N1 at IP address IP1. Next, block 106 depicts designating a key for future communications with D. This key may be a secure key encrypted with one of multiple types of encryption formats. Thereafter, block 108 illustrates transferring the key to D, and the process ends.

Figure 5:
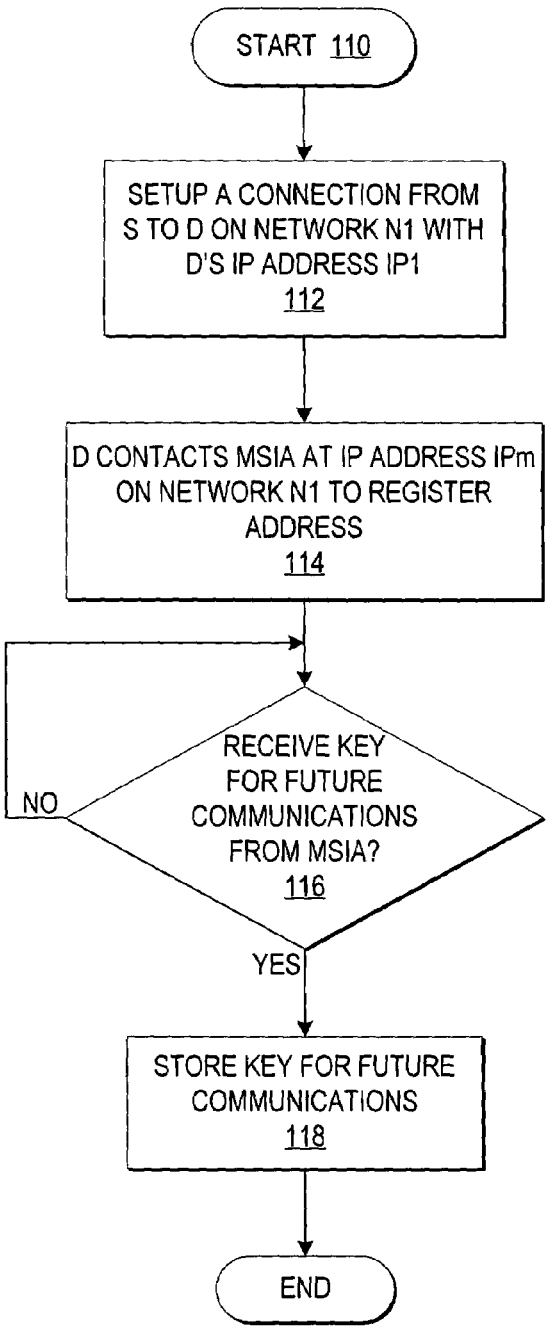
FIG. 5 is a high level logic flowchart depicting a process and program for a mobile device to register with an MSIA.

Referring now to FIG. 5, there is depicted a high level logic flowchart of a process and program for a mobile device to register with an MSIA. As illustrated, the process starts at block 110 and thereafter proceeds to block 112. Block 112 depicts setting up a connection from S to D on network N1 with D's IP address at IP1. Next, block 114 illustrates D contacting MSIA at IP address IPm on network N1 to register D's IP address. Thereafter, block 116 depicts a determination whether a key for future communications is received. Once the key for future communications is received, the process passes to block 118. Block 118 depicts storing the key for future communications, and the process ends.

With reference now to FIG. 6, there is depicted a high level logic flowchart of a process and program for a mobile device initiated transfer from one network to another non-intersecting network. As illustrated, the process starts at block 120, and thereafter proceeds to block 122. Block 122 depicts a determination whether D is ready to move to a new network. If D is not ready to move to a new network, then the process iterates at block 122. If D is ready to move to a new network, then the process passes to block 124. Block 124 illustrates D sending a zero window update to S. Next, block 126 depicts D sending an AddIP instruction to S for adding the MSIA IP address IPm to the connection and deleting IP1. Thereafter, block 128 illustrates D moving from network N1 to network N2. Next, block 130 depicts D contacting the MSIA with the key. Finally, block 132 illustrates D receiving any data held during the network transfer by the MSIA, and the process ends.

Referring now to FIG. 7, there is depicted a high level logic flowchart of a process and program for facilitating a handover of a mobile device through an MSIA. As illustrated, the process starts at block 140 and thereafter proceeds to block 142. Block 142 depicts a determination whether a communication from D is detected that indicates D is ready to transfer networks. If a communication is not detected, then the process iterates at block 142. If a communication is detected, then the process passes to block 146. Block 146 depicts designating a buffer for holding communications for D and the process passes to block 148.

Block 148 depicts a determination whether a key and request to transfer the connection are received. If a key and request to transfer the connection are not received, then the process iterates at block 148. If a key and request to transfer the connection are received, then the process passes to block 150. Block 150 illustrates sending an ADDIP request to change the IP address for D at S to IP2 and delete IPm from the connection at S, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for mobile transmission protocol based handover of a mobile device between non-intersecting networks, comprising:

responsive to detecting a need for a mobile device to transfer out of a first network, sending to a communication endpoint a first request in a mobile transmission protocol to stop transmissions to a first address of said mobile device and a second request in said mobile transmission protocol to add an intermediary address of a mobility support service designated for receiving any communications already in transmission when said first request is sent;

transitioning a communication link for said mobile device from said current address at said first network to a second address at a second network, wherein said first network and said second network are non-intersecting networks; and indicating to said mobility support service that said handover from said first network to said second network is complete, such that said mobility support service sends a third request in said mobile transmission protocol to said communication endpoint to continue communication with said mobile client at said second address.

2. The method for mobile transmission protocol based handover according to claim 1, further comprising:

receiving, from said mobility support service, said communications already in transmission when said first request is sent.

3. The method for mobile transmission protocol based handover according to claim 1, wherein indicating to said mobility support service that said handover from said first network to said second network is complete further comprises:

registering said first address with said mobility support service;

receiving a key from said mobility support service for future communications with said mobility support service; and sending said key to said mobility support service from said second address.

4. The method for mobile transmission protocol based handover according to claim 3, wherein said key is an encrypted key for enabling only authorized future communications.

5. The method for mobile transmission protocol based handover according to claim 1, wherein said mobile transmission protocol is mobile Stream Control Transmission Protocol.

6. The method for mobile transmission protocol based handover according to claim 1, wherein said first request is a zero window update.

7. The method for mobile transmission protocol based handover according to claim 1, wherein said second request and said third request are AddIP requests.

8. A system for mobile transmission protocol based handover of a mobile device between non-intersecting networks, comprising:

a mobile device located at a first address in communication with a device located at a communication endpoint via a first network;

means, responsive to detecting a need for a mobile device to transfer out of a first network, for sending to said communication endpoint a first request in a mobile transmission protocol to stop transmissions to said first address and a second request in said mobile transmission protocol to add an intermediary address of a mobility support service designated for receiving any communications already in transmission when said first request is sent;

means for transitioning a communication link for said mobile device from said current address at said first network to a second address at a second network, wherein said first network and said second network are non-intersecting networks; and means for indicating to said mobility support service that said handover from said first network to said second network is complete, wherein said mobility support service sends a third request in said mobile transmission protocol to said communication endpoint to continue communication with said mobile client at said second address.

9. The system for mobile transmission protocol based handover according to claim 8, further comprising:

means for receiving, from said mobility support service, said communications already in transmission when said first request is sent.

10. The system for mobile transmission protocol based handover according to claim 8, wherein said means for indicating to said mobility support service that said handover from said first network to said second network is complete further comprises:

means for registering said first address with said mobility support service;

means for receiving a key from said mobility support service for future communications with said mobility support service; and means for sending said key to said mobility support service from said second address.

11. The system for mobile transmission protocol based handover according to claim 10, wherein said key is an encrypted key for enabling only authorized future communications.

12. The system for mobile transmission protocol based handover according to claim 8, wherein said mobile transmission protocol is mobile Stream Control Transmission Protocol.

13. The system for mobile transmission protocol based handover according to claim 8, wherein said first request is a zero window update.

14. The system for mobile transmission protocol based handover according to claim 8, wherein said second request and said third request are AddIP requests.

15. A computer program product for mobile transmission protocol based handover of a mobile device between non-intersecting networks, comprising:

means, recorded on said recording medium, for sending to a communication endpoint a first request in a mobile transmission protocol to stop transmissions to a first address of said mobile device and a second request in said mobile transmission protocol to add an intermediary address of a mobility support service designated for receiving any communications already in transmission when said first request is sent, responsive to detecting a need for a mobile device to transfer out of a first network;

means, recorded on said recording medium, for transitioning a communication link for said mobile device from said current address at said first network to a second address at a second network, wherein said first network and said second network are non-intersecting networks; and means, recorded on said recording medium, for indicating to said mobility support service that said handover from said first network to said second network is complete, such that said mobility support service sends a third request in said mobile transmission protocol to said communication endpoint to continue communication with said mobile client at said second address.

16. The computer program product for mobile transmission protocol based handover according to claim 15, further comprising:

means, recorded on said recording medium, for receiving, from said mobility support service, said communications already in transmission when said first request is sent.

17. The computer program product for mobile transmission protocol based handover according to claim 15, wherein said means for indicating to said mobility support service that said handover from said first network to said second network is complete further comprises:

means, recorded on said recording medium, for registering said first address with said mobility support service;

means, recorded on said recording medium, for receiving a key from said mobility support service for future communications with said mobility support service; and means, recorded on said recording medium, for sending said key to said mobility support service from said second address.

18. A method for supporting mobile transmission protocol based handover of a mobile device between non-intersecting networks, comprising:

transferring, from a mobile support service, a key for future communications from a mobile device registered at a first address and in communication with a device located at a communication endpoint accessible via a first network; and responsive to receiving said key at said mobile support service from said mobile device located at a second address within a second network non-intersecting said first network, sending a request from said mobile support service in said mobile transmission protocol to said communication endpoint to add said second address as a destination address for communication with said mobile device.

19. The method according to claim 18 for supporting mobile transmission protocol handover further comprising:

receiving, at said mobile support service, communications intended for said mobile device, but transmitted from said communication endpoint before said mobile device choked the connection to said first network and added an address for said communication endpoint as a destination address for communications with said mobile device; and buffering said communications until requested from said mobile device with said key.

20. The method according to claim 18 for supporting mobile transmission protocol handover, wherein said mobile transmission protocol is the mobile Stream Control Transmission Protocol.

21. The method according to claim 18 for supporting mobile transmission protocol handover, wherein said request in said mobile transmission protocol is an AddIP request.

22. A system for supporting mobile transmission protocol based handover of a mobile device between non-intersecting networks, comprising:
- a mobile support service residing in a server system communicatively connected to a first network accessible to a mobile device;
- said mobile support service further comprising:
- means for transferring a key for future communications from said mobile device registered at a first address and in communication with a device located at a communication endpoint accessible via said first network; and
- means, responsive to receiving said key from said mobile device located at a second address within a second network non-intersecting said first network, for sending a request in said mobile transmission protocol to said communication endpoint to add said second address as a destination address for communication with said mobile device.

23. The system according to claim 22 for supporting mobile transmission protocol handover, said mobile support service further comprising:
- means for receiving communications intended for said mobile device, but transmitted from said communication endpoint before said mobile device choked the connection to said first network and added an address for said communication endpoint as a destination address for communications with said mobile device; and
- means for buffering said communications until requested from said mobile device with said key.

24. The system according to claim 22 for supporting mobile transmission protocol handover, wherein said mobile transmission protocol is the mobile Stream Control Transmission Protocol.

25. The system according to claim 22 for supporting mobile transmission protocol handover, wherein said request in said mobile transmission protocol is an AddIP request.

26. A computer program product for supporting mobile transmission protocol based handover of a mobile device between non-intersecting networks, comprising:
- a recording medium;
- means, recorded on said recording medium, for transferring, from a mobile support service, a key for future communications from a mobile device registered at a first address and in communication with a device located at a communication endpoint accessible via a first network; and
- means, recorded on said recording medium, for sending a request from said mobile support service in said mobile transmission protocol to said communication endpoint to add said second address as a destination address for communication with said mobile device, responsive to receiving said key at said mobile support service from said mobile device located at a second address within a second network non-intersecting said first network.

27. The computer program product according to claim 26 for supporting mobile transmission protocol handover further comprising:
- means, recorded on said recording medium, for receiving, at said mobile support service, communications intended for said mobile device, but transmitted from said communication endpoint before said mobile device choked the connection to said first network and added an address for said communication endpoint as a destination address for communications with said mobile device; and
- means, recorded on said recording medium, for buffering said communications until requested from said mobile device with said key.

* * * * *